United States Patent [19]
Stathakos

[11] 3,844,925
[45] Oct. 29, 1974

[54] MOLECULAR FRACTIONATION

[75] Inventor: Dimitri Stathakos, Cambridge, Mass.

[73] Assignee: Center for Blood Research, Boston, Mass.

[22] Filed: July 2, 1973

[21] Appl. No.: 375,659

[52] U.S. Cl. ............ 204/299, 204/180 G, 204/301
[51] Int. Cl. ............................................. B01k 5/00
[58] Field of Search ............ 204/299, 180 G, 180 R

[56] References Cited
UNITED STATES PATENTS

| | | | |
|---|---|---|---|
| 3,451,911 | 6/1969 | Tannenberger et al. | 204/180 R |
| 3,485,736 | 12/1969 | Yngve | 204/180 R |
| 3,497,438 | 2/1970 | Badgley | 204/180 R |
| 3,515,664 | 6/1970 | Johnson et al. | 204/180 P X |
| 3,533,933 | 10/1970 | Strauch | 204/180 G |
| 3,649,499 | 3/1972 | Virtanen et al. | 204/180 R |
| 3,704,217 | 11/1972 | Nerenberg | 204/180 G |
| 3,791,950 | 2/1974 | Allington | 204/299 X |

*Primary Examiner*—John H. Mack
*Assistant Examiner*—A. C. Prescott

[57] ABSTRACT

A fractionation column formed by a series of separable segments, suitable for isoelectric focusing. Supports, in the preferred form of membranes permeable to ampholytes, support individual units of the solid phase enabling them to be removed for additional processing, as in further columns. Liquid interlayer zones are defined between solid phase portions enabling insertion of mixtures, withdrawal of fractions or residues to be saved, and measurement of pH either directly or by sample, all without disturbing the bands of molecules being focused. A vertical fractionation column is shown consisting of a repeated sequence of tubular elements, spacers and membranes with liquid ingress and egress in the membrane regions.

16 Claims, 11 Drawing Figures

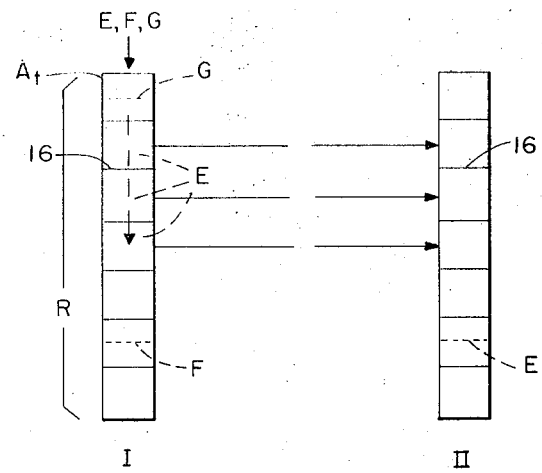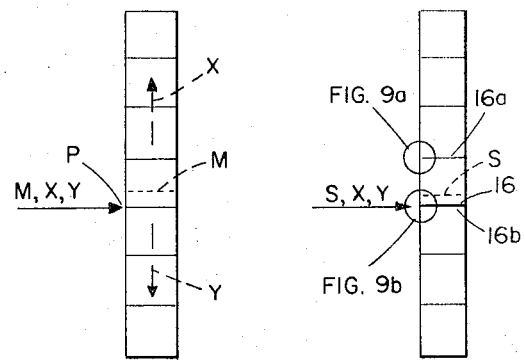
FIG. 7  FIG. 8  FIG. 9
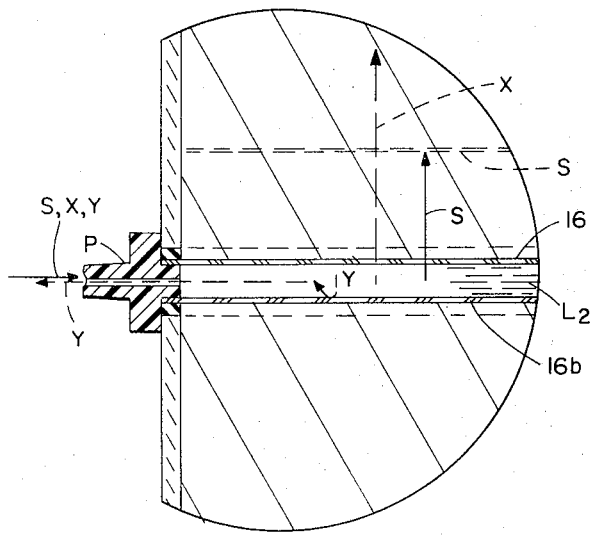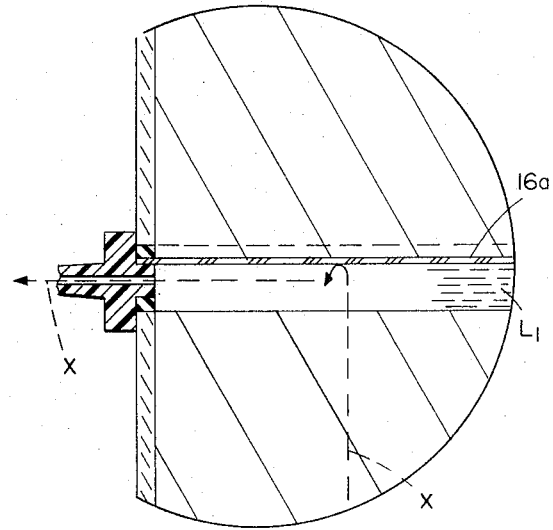
FIG. 9b  FIG. 9a

MOLECULAR FRACTIONATION

BACKGROUND

Principles of Fractionation by Isoelectric Focusing

When a d.c. potential is applied to a solution of electrolytes, a pH-gradient will be established which steadily increases from the anode to the cathode. Every ampholyte present in the solution (such as polypeptide, protein or other molecule carrying negative and positive charges) will migrate according to its relative distance from the two poles, until it reaches its isoelectric point (pI) where its net charge will be zero. If the pH-gradient can be maintained stable during the experiment, in theory all ampholytes present in the system will equilibrate themselves at their respective isoelectric points.

The pH-gradient is efficiently achieved by introducing into the solution a mixture of low-molecular weight carrier-ampholytes with isoelectric points adjacent to each other. On application of the potential, these form a continuous pH-gradient within a predetermined pH-range. An example of such carrier-ampholytes are those produced by LKB-Produkter Broma-Sweden, under the trade name "Ampholines."

After focusing of the desired molecular species has been achieved, this fraction in some manner is collected. The equipment available to date for isoelectric focusing falls under two main categories:

Prior Liquid-Phase Electrofocusing

A potential is applied to a solution of carrier-ampholytes contained in a vertical cylinder or a horizontal tray. The sample is either already mixed with the ampholyte solution or it is introduced after formation of the pH-gradient. A density-gradient is used (e.g., sucrose, glycerol or ethylene glycol, etc.) to protect against convection phenomena, as well as diffusion and remixing of the focused zones. After focusing, the column is slowly emptied and the fractions are collected into a fraction collector.

Disadvantages:

I. According to the principle of isoelectric focusing, maximal efficiency depends on the sharpness of separation, i.e., the best possible concentration of the molecules at the pI. On the other hand many proteins tend to precipitate at their pIs. In a vertical column, when this occurs with the desired protein or any other molecular species of the mixture, especially one above the fraction of interest, flocculation and precipitation ruin the experiment.

II. Remixing of the zones occurs by necessity on elution, since the focused zones have to be collected by a flow through a tubing, thus losing their geometry.

III. The procedure takes 24 to 72 hours or longer depending on the composition of the mixture.

IV. If a fraction, partially purified in a broad pH gradient (e.g., pH 3–10), has to be rerun in a narrow range (e.g., pH 5–7) the fraction has first to be painstakingly collected as usual and re-introduced to a new column.

V. pH-measurements and evaluation of the pH-gradient are possible only after the end of the experiment.

Prior gel-electrofocusing

The medium containing the carrier-ampholytes is a solid phase such as a gel of appropriate consistence (poly-acrylamide, agarose, etc.) and the potential is applied between the two extremities of the gel contained in a vertical cylinder or slab-form or in the form of a horizontal thin layer.

Advantages:

I. The solid phase matrix counteracts the diffusion and convection phenomena observed in the liquid system.

II. The fine porosity of the matrix greatly hinders the aggregation of molecules when concentrated at their isoelectric points. Furthermore, even in the case of aggregation, no precipitation can occur.

III. No remixing of the zones is possible. The solid phase is sliced and the zones are eluted separately.

Disadvantages:

I. Migration through a solid phase being a function of molecular size, some proteins or other macro molecules never reach their pI before the pH-gradient starts to disintegrate. Thus very low acrylamide concentrations with reduced solid phase properties have to be used which partially introduce the disadvantages of the liquid systems and make slicing extremely difficult for preparative purposes (diameters over 5mm).

II. The solid phase has to be sliced and the slices have to be eluted with distilled water of low conductivity before the pHs can be measured. So, as with liquid systems, the nature of the pH-gradient can be established first after the end of the experiment.

III. Re-focusing of a partially purified fraction (e.g., pH-range 3–10) in a narrower region (e.g., pH 5–7) is even more tedious than with the liquid system since it requires slicing of the solid phase, elution of slices and re-application of the desired fraction to a new column.

Objects and Features of the Invention

Objects of the invention are to provide improved apparatus and methods for isoelectric fractionation of charged macromolecules such as proteins. Particular objects include the provision of apparatus which is simpler, decreases the time of separation, and increases over a given time the accuracy of the separations achieved and the amounts of the substance isolated. A specific object is to improve isoelectric focusing using solid phase columns.

The invention features an apparatus useful for isoelectric focusing in which the container for the focusing column comprises a series of separable segments, normally three or more, each defining a portion of the length of the column through which the ampholyte molecules migrate, the segments including supports for respective portions of solid phases of the column whereby each segment may be individually removed from the column.

Preferred embodiments of the invention feature: a series of identical modules sealable against one another and separable whereby any module can be removed and incorporated into a second column of identical modules of expanded pH gradient for further fractionation; the support of an individual module comprising a solid member permeable to ampholytes, in certain preferred instances both to small molecule carrier ampholytes and macromolecule ampholytes to be separated, the support preferably being a membrane extending across the column; and the construction in which adjacent segments of the column container define liquid interlayer zones between adjacent solid phase positions whereby liquid in these zones establish diffusion and electrical continuity between solid phase portions, enabling ampholyte molecules to pass through one solid phase portion into the next via the interlayer liquid. In addition to thus facilitating the interconnection of the solid phase portions into a single isoelectric column, and separation thereof after the run, the liquid interlayers provide ready means for determining pH along the column and for introducing and removing mixtures and fractions thereof. Advantageously spacers provide for support of the membranes above the liquid interlayers.

Another aspect of the invention is a vertical fractionating column comprising in combination a series of rings, a series of tubular members and a series of membranes where each ring is adapted to removably rest upon a tubular member, support a membrane across a lower cross-section of the tubular member, and support above the ring a further tubular member, and in which the membrane has strength properties sufficient to support a predetermined solid phase confined thereabove by the respective tubular member.

Preferred embodiments according to this aspect feature a spacer means for spacing a respective membrane above the respective end of the next below tubular member, to define a liquid interlayer zone between successive solid phase portions of said column, preferably including liquid passages communicating on opposite sides with the respective liquid interlayer zone and preferably including electrode means disposed in the respective interlayer zones for reading pH levels.

Still another aspect of the invention comprises the selection of certain entry points along the column and solid phase and membrane characteristics which facilitate rapid and complex fractionations.

These and other features and objects of the invention will be understood from the following description of preferred embodiments taken in conjunction with the drawings.

IN THE DRAWINGS:

FIGS. 5-9 are each a diagram of a particular procedure using the apparatus of FIG. 1 while FIGS. 9a and 9b are magnified views of the respective encircled portion of the view of FIG. 9.

DESCRIPTION OF PREFERRED EMBODIMENTS

Figure 1:
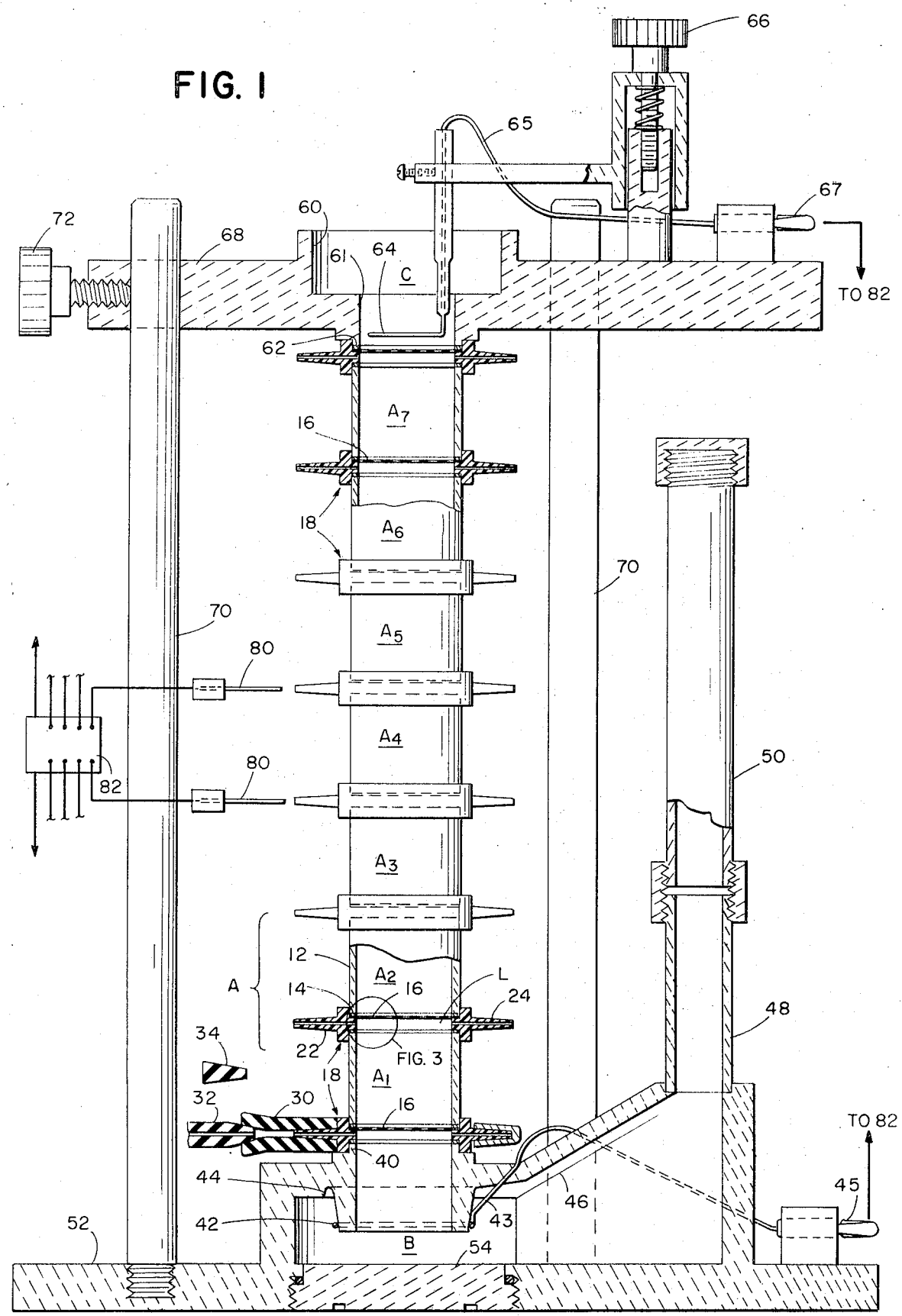
FIG. 1 is a side view partly in cross-section of a preferred embodiment of the invention.

The apparatus, assembled as shown in FIG. 1, consists of a sequence of separable units A (seven in FIG. 1; $A_1$ to $A_7$) placed vertically between two electrode chambers, the lower electrode chamber B and the upper electrode chamber C.

Figure 2:
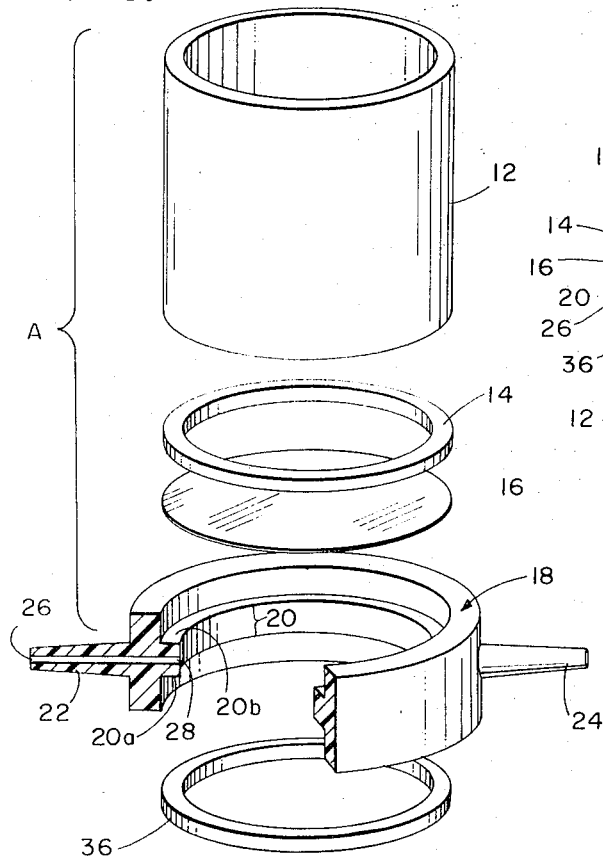
FIG. 2 is an exploded view of one of the units of FIG. 1.
Figure 3:
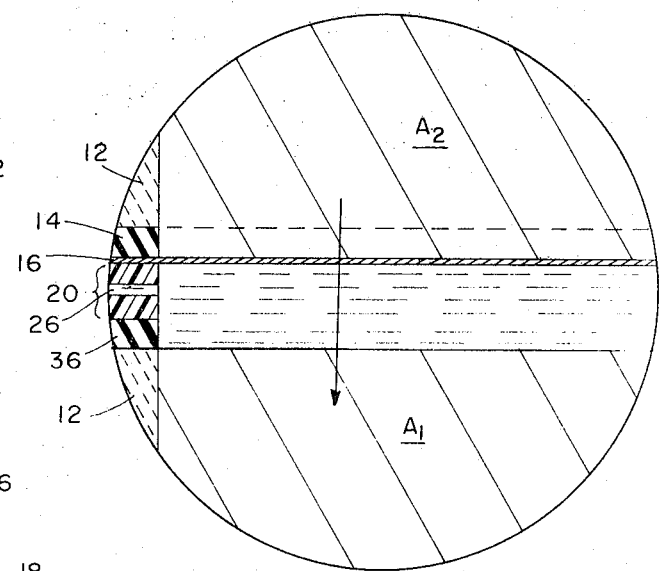
FIG. 3 is a highly magnified cross-sectional view taken in the region of the circle of FIG. 1.

A. Each unit A is composed of the following parts, referring to the assembly drawing of FIG. 1, the exploded view of FIG. 2, and the magnified view of FIG. 3:

a tube 12 constructed of an appropriate non-conducting material such as plexiglass;

an O-ring 14 of appropriate sealing properties, such as rubber or silicone rubber;

a supporting membrane 16 such as filter or dialysis membrane which allows free passage of molecules across its surface (e.g., filter with porosity of 0.65 $\mu$) or, alternatively, allows the passage of small molecules and carrier-ampholytes but excludes a certain molecular-weight range (e.g., a dialysis membrane);

a structural ring 18 having the same inner diameter as the tube 12 and provided with a shoulder 20 on which the tube can rest. The lower shoulder surface 20a rests via O-ring 36 upon the tube 12 of the next below unit; the upper shoulder surface 20b, spaced above lower surface 20, provides a seat for supporting the membrane, and the O-ring 14 and tube 12 on top. The space between lower and upper surfaces defines a volume for an interlayer of liquid. Two outlet nipples 22, 24 diametrically situated on the ring with passages 26, 28 to the interior, allow insertion and withdrawal of liquid into the inter-layer space of the ring. The nipples 22, 24 are each jacketed by an elastic piece of tubing 30, into which filler tubing 32 of a peristaltic pump or, alternatively, a plastic plug 34 can be inserted;

the second O-ring 36 of same properties as O-ring 14.

B. The lower electrode chamber B, referring to FIG. 2, consists of a hollow cylindrical electrolyte compartment through which runs a tubular segment 40 carrying a circular platinum electrode 42 on the outer circumference at its lower end connected through lead 43 to terminal 45. The structural ring 18 of the first unit A, is seated in the upper end of this tubular segment 40 which protrudes above the top of the electrode chamber B.

The electrolyte compartment has an upper annular gas-collection groove 44 above the electrode 42 and this groove is connected by a sloped tubular channel 46 to a vertical tube 48 which serves as an inlet to the lower electrolyte solution and as a vent for the electrolysis gases produced when current is applied. (If the apparatus is used as an all-liquid system, this tube can be fitted with extensions 50 and filled to the appropriate level thus providing the counterpressure necessary for the equilibration of the system.) The lower electrode chamber B rests on a sturdy base 52, a circular part 54 of which can be unscrewed, thus providing free access for servicing the lower electrode chamber.

C. The upper electrode chamber C consists of a circular tray 60 with a concentric tube 61 protruding downward of the same internal and external diameters as the tubular part of the units A as well as the tubular segment 40 protruding from the lower electrode chamber B. A double-circular horizontal platinum electrode 64 can move vertically in this segment and its height is adjustable by means of a screw 66. This electrode is connected by lead 65 to terminal 67.

The upper chamber C is supported by a sturdy platform 68 which can slide along three (or more) vertical rods 70 which run through it and which protrude vertically from the base of the apparatus. By means of screws 72 the upper electrode chamber can be secured at the desired height.

After assembly, the apparatus presents from the inside a continuous tubular surface from one end to the other, compartmented by the supporting membranes 16.

Procedure

Figure 4:
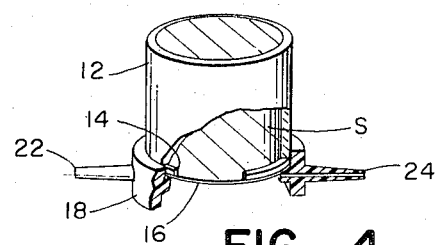
FIG. 4 is a perspective view, partially broken away, of a single unit at the point when a gel has been cast therein in preparation for assembling the column.

Step 1. Assembly of the column. Each assembled unit A is separately filled to the upper edge of tube 12 with the solid phase S, FIG. 4. In the case of gels, acrylamide solution (or other polymerizable substance) is allowed to polymerize in the unit above support membrane 16, thus forming the solid cylindrical phase S. If the supporting membrane 16 shows sufficient surface tension (such as dialysis membranes or plastic filter membranes of appropriate porosity formed by bombardment of nuclear particles, such as Nucleopore trademark membranes) polymerization occurs without passage of the liquid through the membrane. In other cases a rubber blocking disc of the same diameter as the internal diameter of the structural ring 18 is inserted into the ring, under the supporting membrane 16 to hinder leakage through the membrane of the solution during polymerization. After polymerization the units are stacked, starting on the base cylinder 40 as shown in FIG. 1. As stacking proceeds, a discontinuous column is formed, of cylinders of solid phase S separated by interlayer spaces L provided by the structural rings 18. Care should be taken that all outlet nipples 22 of the rings have the same orientation. The number of units is determined by the experimental needs. On the last unit an additional structural ring 18 is fitted, a filter 16 and an O-ring 14 are placed in it and then the upper electrode chamber C is lowered until its lower tubular part 62 settles on the O-ring. At this position the platform is secured by tightening the screws 72 against the metal rods 70. (Note: In this description the solid pahse is formed by polymerization in the gel-unit. It should be noted, however, that other materials of appropriate porosity and stabilizing capacity against convection and diffusion can be used, also in the form of pre-fabricated compact "porous" units.)

Step 2. Introduction of the liquid phase. The nature of the experiment determines whether the anolyte is contained in the lower chamber B and the catholyte in the upper chamber C (a more common case) or vice versa. The polarity of the electro-focusing run will not be considered at this point.

The lower electrolyte (containing 10 percent sucrose or 10–20 percent glycerol or other appropriate additive raising its density) is poured through the auxilliary tube 48 into the lower chamber B. Care is taken, by tilting the apparatus slightly, that no air bubbles be trapped by adhesion to the ceiling of the chamber. During this, one outlet of the lowest ring 18 is open to let trapped air out of the cylinder 40. When the liquid reaches the supporting membrane 16 of unit A, the open outlet of the lowest ring is plugged with a small rod 34 and the auxilliary tube 48 is filled to a level of approximately 5 cm above the first ring 18. Subsequently, the apparatus is slightly tilted at an angle of over 10° from verticality in the direction of the ring-outlets. The interspace L between the upper end of each solid phase S and the next-higher supporting membrane 16 is filled by means of a peristaltic pump with an aqueous solution containing the same concentration of carrier-ampholytes as the gel, thus electrically connecting the series of spaced solid phase segments by interlayers of liquid. This is done through the "lower" outlet of the rings (i.e., the one pointing to the direction of tilting), while venting displaced air from the upper outlet. When the interspace is filled, both outlets are plugged.

The apparatus is then returned to vertical position. By means of a peristaltic pump the same solution which was used to form the liquid interlayers is inserted through one of the outlets of the lowest ring 18 into the space beneath the supporting membrane of the first unit, thus slowly displacing the more dense electrolyte solution. When an aqueous layer of a height of approximately 5 mm is formed the outlet is plugged again. At this point the upper electrolyte solution is poured into the upper chamber to a level approximately 10 mm above the bottom of the tray.

Step 3. Application of the sample.

1st case: The sample is applied on the top of the column. A layer of sucrose (5–10 percent) or glycerol, etc., is layered on the top supporting membrane beneath the electrolyte solution by means of a peristaltic pump. The sample containing a higher concentration of the same neutral additive (sucrose, glycerol, etc.), hence denser, is slowly pumped on the supporting membrane and forms a bottom layer.

2nd case: The sample is applied at a predetermined point. The sample contains a low concentration of sucrose or glycerol. The apparatus is slightly tilted as in Step 2 and the sample is introduced through one of the outlets (the "lower" one) of the chosen ring by means of a peristaltic pump, thus displacing the liquid interlayer which flows out through the opposite, opened outlet of the ring.

Addition of a colored substance to the sample facilitates observation during this procedure.

Step 4. Application of electric current.

At this point it should be noted that often, depending on the lability of the sample, it is desirable to prerun the apparatus before applying the sample. This is done at 2–4 mA for approximately 60 minutes.

After application of the sample the electric current is held constant at 2–4 mA. As the carrier-ampholytes focus and the conductivity of the system falls, the voltage steadily increases. When it reaches approximately 180 V (approx. 16–20 hours) the power supply is switched to constant voltage and maintained at this value for the rest of the run.

During the experiment small samples (a few $\mu$l) are withdrawn from the ring outlets and the pH is measured. The run is usually terminated when the pH-gradient begins to disintegrate, by "stretching" toward the two poles.

Alternatively, thin electrodes 80 inserted in the liquid interlayers can provide continuous measurements which are fed into an automated print-out and control system 82.

5. APPLICATIONS IN FRACTIONATING PROBLEMS

Example 1: A mixture of proteins contains a protein of interest (to be isolated), whose pI is approximately 7.1 to 7.3 as established by analytical runs.

Figure 5:
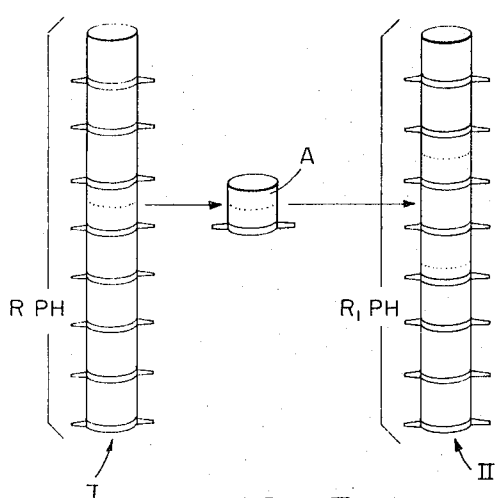

Experimental approach: Referring to FIG. 5, the sample is run in the column I in a pH range R of 3–10. The gel-unit $A_5$ which contains the pI of the protein of interest is then simply removed from column I and incorporated into a second column II with a wider scale ampholyte range, e.g., $R_1$ of 6–8. The system is rerun until isolation is achieved.

Example 2: A mixture of proteins of interest, a first protein of pI of approximately 5 and a second protein of pI of approximately 8.

Figure 6:
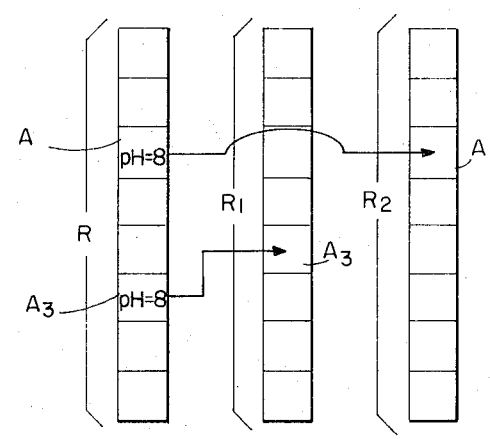

Experimental approach: Referring to FIG. 6, the sample is run at the range R of pH 3–10. The two units containing the desired fractions, $A_3$ and $A_6$ are then incorporated into two separate columns, ranging from say, $R_1$ of pH 4 to 6 and $R_2$ of pH 7 to 9 respectively, and rerun.

Example 3: Three proteins have to be isolated from the same sample. Proteins E and F have adjacent pIs, e.g., approximately 2 and nuclear weights $E = 300,000$ and $F = 50,000$ daltons. Protein G has a pI of approximately 8.

Experimental approach: Referring to FIG. 7, the pH range R of 4–9 for column I is selected. The upper electrode chamber is the cathode (pH > 11). The top gel-unit $A_t$ in which G will focus has a large pore-size and all subsequent gels toward the anode (i.e., lower pH) have a small pore-size, to pass F but not readily E, (the pore size varying inversely with the concentration of acrylamide in the gel). Protein G will easily focus at pH 8. Protein E will pass down through the unit where G focuses but will then be retarded (due to its high molecular weight and the sieving effect of the gel units) in its migration toward the anode. It will be separated from protein F which migrates relatively rapidly through the gel and focuses at its pI. Subsequently, the gel-units containing protein E, still in migration, are made "top-units" of a new column II of e.g., the same pH range, where all below units have large pores and facilitate passage of E through the units to focus at its pI. Alternative to the arrangement of column II as shown, the order of the "top units" can be reversed, together with reversal of the pH, thus to drive molecules E in the reverse direction out of the small pore gel units, this being preferred where the pore size of the units is so high as to have permitted little movement of E in the initial column.

Example 4: A protein M of very high molecular weight has to be isolated from a mixture.

Experimental approach: Referring to FIG. 8, the sample is inserted into a high-porosity column, at a point P (ring outlet) very close to its expected isoelectric point. During the run, the contaminants X, Y migrate away and are thus removed from the slowly focusing protein of interest. The short distance required for M to travel by this approach saves time over other approaches.

Example 5: The sample contains a protein of prime interest of, say, pI 5, but it also contains other macromolecules which are not to be wasted.

Experimental approach: Referring to FIGS. 9–9b the sample is inserted through the outlet closest to its pI. The gel supporting membrane 16a above this pI is a dialysis membrane of known exclusion limits which traps in the liquid interlayer L first below it all upwardly migrating macromolecular constituents X. A similar membrane 16b is introduced below said pI on top of the next lower cylinder, thus providing a second trap for downwardly migrating molecules Y. The macromolecules migrating to either side of the pI will thus accumulate in the two liquid interlayers $L_1$ and $L_2$ from where they can be readily withdrawn after the end of the run.

Example 6: Three proteins of separate pIs, say 4.5, 7 and 9, are contained respectively in three different samples unrelated to one another. Can they be isolated simultaneously?

Experimental approach: The experiment is run at pH 3–10. Each of the three mixtures is inserted into the liquid interlayer closest to its pI, respectively, and dialysis-membrane traps are placed between these pIs (as in the previous sample), actually segregating three electrofocusing runs performed simultaneously in the same apparatus. A considerable gain in time for the experimenter is realized.

Example 7: A mixture of synthesized carrier-ampholytes has to be fractionated into narrow-pH-range fractions.

Experimental approach: The whole apparatus can be converted into an all-liquid system. The auxilliary tube 50, FIG. 1, provides the necessary hydrostatic counterpressure. Membranes 16 are placed on either side of each ring 18, thus immobilizing the interlayers and also serving the additional purpose of hindering convection and diffusion. After the run, the cylinders are slowly emptied, starting with the top unit, each through the outlet of the next-lower interlayer.

Example 8: A protein has been fractionated through subsequent isoelectric runs until it is considered isolated; it is contained in a gel-unit. It can be recovered instead of by maceration of the gel and elution, by use of a previously known technique of gel-electrophoresis.

Experimental approach: The gel-unit 10 is placed between the two electrode chambers (as a single-unit column) which contain an appropriate buffer, i.e., one with a pH well above or below the pI of said protein. A dialysis-membrane trap is placed on the side of the gel-unit where the protein is expected to migrate and a d.c. potential is applied. The protein will accumulate at the "trap."

Example 9: A protein of particularly slow migration is not focused even after the onset of disintegration of the pH-gradient.

Experimental approach: The column is left intact, the electrode chambers are emptied and subsequently filled with fresh electrolyte solutions. A fresh carrier-ampholyte solution of appropriate high concentration is inserted into the rings to displace the old liquid interlayer. (The concentration of carrier-ampholytes in the fresh solution is such that, after equilibration of the system, a pH-gradient identical to the previous one will be formed.)

In this manner the experiment can be "extended" in time until isolation is achieved. This is not possible with any other system.

Example 10: After focusing in a pilot experiment, the desired focused fraction is found to overlap two units. It is desired to place the fraction in one unit.

Experimental approach: The entire column of ampholytes and focused molecules is shifted upwardly relative to the gel and fixed structure. This is accomplished by raising the upper electrode by means of the screw 66, introducing additional neutral upper layer above unit $A_7$ and at the same time removing neutral layer and its fractionated ampholytes from the zone below the lowest membrane.

Numerous other embodiments and examples will be understood to be within the spirit and scope of the invention. Mention is made of a horizontal series of separable units, forming a horizontal column, and units in which a continuous gel through a number of container segments is severable with separation of the segments.

What is claimed is:

1. In apparatus for isoelectric fractionation of charged molecules comprising a solid phase container defining a column and means for applying electric potential between the ends of said column effective upon ampholyte molecules in said solid phase to establish a pH gradient along the column, whereby desired molecules can migrate to and accumulate at positions along the length of the column corresponding to their isoelectric points, the improvement wherein said container comprises a series of separable segments, normally three or more, each defining a portion of the length of the solid phase column through which the molecules migrate, the segments including supports for respective portions of said solid phase whereby they may be individually removed from said column.

2. The apparatus of claim 1 wherein said column is comprised of a series of identical modules sealable against one another to form a unitary column and separable from one another whereby a molecule layer fraction in the solid phase of any module can, with its module, be removed from said column and incorporated in a column of identical modules with expanded pH gradient including the isoelectric point of said given molecule thereby to further separate a given molecule from others.

3. The apparatus of claim 1 wherein said support comprises a solid member permeable to carrier ampholytes.

4. The apparatus of claim 3 wherein said solid member is permeable to a macromolecular ampholyte to be fractionated.

5. The apparatus of claim 1 wherein each segment includes a membrane extending across its cross-section in a position to support the respective solid phase portion in the respective segment.

6. The apparatus of claim 1 wherein in the assembled position adjacent segments define liquid interlayer zones between adjacent solid phase positions whereby liquid in said interlayer zones can establish diffusion and electrical continuity between spaced portions of solid phase, enabling ampholyte molecules to pass through one solid phase portion into the next solid phase portion via said liquid interlayer.

7. The apparatus of claim 6 including liquid inlet and outlet means communicating with said liquid interlayer zones.

8. The apparatus of claim 6 including a pH sensing system disposed to sense the pH of liquid in said interlayers.

9. The apparatus of claim 6 including spacer means interconnecting adjacent segments and defining said liquid interlayer zones.

10. The apparatus of claim 9 wherein said column is cylindrical and said spacer means comprises a ring member, said ring member including fluid passages on opposite sides for introducing and removing fluid relative to said liquid interlayer zones.

11. The apparatus of claim 6 wherein said column is vertical and said support of a given segment comprises a member extending across said column forming the upper boundary of said liquid interlayer zone.

12. The apparatus of claim 1 wherein said column contains a permeable solid phase and said molecules for establishing said pH gradient along the column comprise a series of carrier ampholytes.

13. A vertical fractionating column comprising in combination a series of rings, a series of tubular members and a series of membranes, each ring adapted to removably rest upon a tubular member, support a membrane across a lower cross-section of said tubular member, and support above said ring a further tubular member, said membrane having strength properties sufficient to support a predetermined solid phase confined thereabove by the respective above tubular member.

14. The fractionating column of claim 13 including spacer means for spacing the respective membranes above the respective ends of the next below tubular members thereby to define liquid interlayer zones between successive solid phase portions of said column.

15. The fractionating column of claim 14 including liquid passages communicating on opposite sides with the respective liquid interlayer zones.

16. The fractionating column of claim 14 including electrode means disposed in the respective interlayer zones for reading pH levels.

* * * * *